United States Patent [19]

Yoshimi et al.

[11] Patent Number: 4,460,036

[45] Date of Patent: Jul. 17, 1984

[54] MULTIZONE AIR-CONDITIONING SYSTEM FOR MOTOR VEHICLES

[75] Inventors: Akiro Yoshimi, Obu; Akio Takemi, Kariya; Kazuyoshi Suzuki, Ichinomiya, all of Japan

[73] Assignee: Nippondenso Co., Ltd., Kariya, Japan

[21] Appl. No.: 393,519

[22] Filed: Jun. 29, 1982

[30] Foreign Application Priority Data

Jul. 3, 1981 [JP] Japan ................................ 56-104793

[51] Int. Cl.³ ............................................ F25B 29/00
[52] U.S. Cl. ...................................... 165/12; 165/30; 165/36; 165/42; 62/244; 98/2.01; 98/2.05
[58] Field of Search ...................... 165/12, 22, 30, 35, 165/36, 42, 43; 62/244; 237/2 A; 98/2.01, 2.05

[56] References Cited

U.S. PATENT DOCUMENTS

| | | | |
|---|---|---|---|
| 4,042,013 | 8/1977 | Demaray et al. | 165/22 |
| 4,289,195 | 9/1981 | Bellot et al. | 165/16 |
| 4,311,188 | 1/1982 | Kojima et al. | 165/43 |
| 4,337,821 | 7/1982 | Saito | 165/12 |
| 4,345,714 | 8/1982 | Kojima | 165/12 |
| 4,368,843 | 1/1983 | Kai et al. | 165/12 |
| 4,375,754 | 3/1983 | Okura | 165/43 |
| 4,385,503 | 5/1983 | Okura | 165/43 |

FOREIGN PATENT DOCUMENTS

| | | | |
|---|---|---|---|
| 55-36122 | 3/1980 | Japan | 165/43 |
| 1423043 | 1/1976 | United Kingdom | 165/42 |

*Primary Examiner*—Allen M. Ostrager
*Attorney, Agent, or Firm*—Cushman, Darby & Cushman

[57] ABSTRACT

A multizone air-conditioning system for a motor vehicle includes a single air-conditioning unit and an air distribution conduit. The air distribution conduit has multiple conduit portions with outlets respectively open to horizontally spaced apart zones of the passenger compartment. Each outlet has a switching damper for diverting a variable amount of conditioned airflow in response to a feedback control signal to vertically spaced apart zones of the compartment to automatically operate the system in one of different air-conditioned modes. The control signal is derived from temperature measurement data and a reference setting establised with respect to each horizontally spaced apart zone. The air-conditioning unit includes air mixing dampers respectively located in the conduit portions and a heating radiator having half portions thereof located respectively downstream of the mixing dampers. A correction signal is obtained from the result of comparison between the settings of air mixing dampers to control the setting of each switching damper to minimize the effect of thermal interferences which might exist between the conduit portions.

5 Claims, 5 Drawing Figures

MULTIZONE AIR-CONDITIONING SYSTEM FOR MOTOR VEHICLES

BACKGROUND OF THE INVENTION

The present invention relates to an air-conditioning system for the passenger compartment of a motor vehicle which provides conditioned airflows respectively to several zones of the compartment.

Multizone air conditioning systems using a single air-conditioning unit are known in the art for the passenger compartment of a vehicle to take advantage of its economy and compactness.

SUMMARY OF THE INVENTION

The present invention has for its object the provision of a multizone air-conditioning system for a motor vehicle having a single air-conditioning unit and an air distribution conduit. The air distribution conduit has multiple conduit portions with outlets respectively open to horizontally spaced apart zones of the passenger compartment, each conduit portion having a damper for diverting a variable amount of conditioned airflow in response to a feedback control signal to verticaly spaced apart zones of the compartment.

In a preferred embodiment, a single heating radiator is mounted on a support that separates the distribution conduit into the conduit portions so that its first and second halves are positioned respectively in respective conduit portions and at least two air mixing dampers are respectively located upstream of the first and second halves of the heating radiator to divert a variable amount of cool airflow thereto. The outlet end portion of each conduit portion is divided into upper and lower chambers by a partition and each of the switching dampers is pivotally mounted on a horizontal axis at the edge of the partition to divert a variable amount of cool and warm airflows through the chambers to vertically spaced apart zones. An electronic control unit provides control signals to the air mixing dampers for temperature control and to the switching dampers for operating the system in a desired air-conditioned mode in response to the deviation of measured temperatures from reference settings of the multiple zones.

The invention eliminates undesirable consequences arising from thermal interferences which might exist between the separated conduit portions. This prevents conditioned airflows from being discharged from wrong outlets.

In a further preferred embodiment, the air-conditioning system of the invention comprises fan means and an evaporator located in the distribution conduit downstream of the fan means. The heating radiator is located downstream of the evaporator. The first and second air mixing dampers divert a variable amount of airflow from the evaporator to the heating means. First temperature sensors are provided for measuring the temperatures of the evaporator and the heating means, and second temperature sensors are provided for measuring the temperature inside and outside the passenger compartment. Reference temperatures are established by a manual control board for the horizontally spaced apart zones of the passenger compartment. The control unit derives first control variables from temperature measurement data iindicative of the inside and outside temperatures and temperature reference data, derives second control variables from the first control variables and temperature measurement data indicative of the temperatures of the evaporator and heating means, and derives third control variables from the first and second control variables. A plurality of motor means actuate the air mixing dampers in response to the second control variables and actuate the first and second switching dampers in response to the third control variables.

BRIEF DESCRIPTION OF THE DRAWINGS

The present invention will be described in further detail with reference to the accompanying drawings, in which.

DETAILED DESCRIPTION

Figure 1:
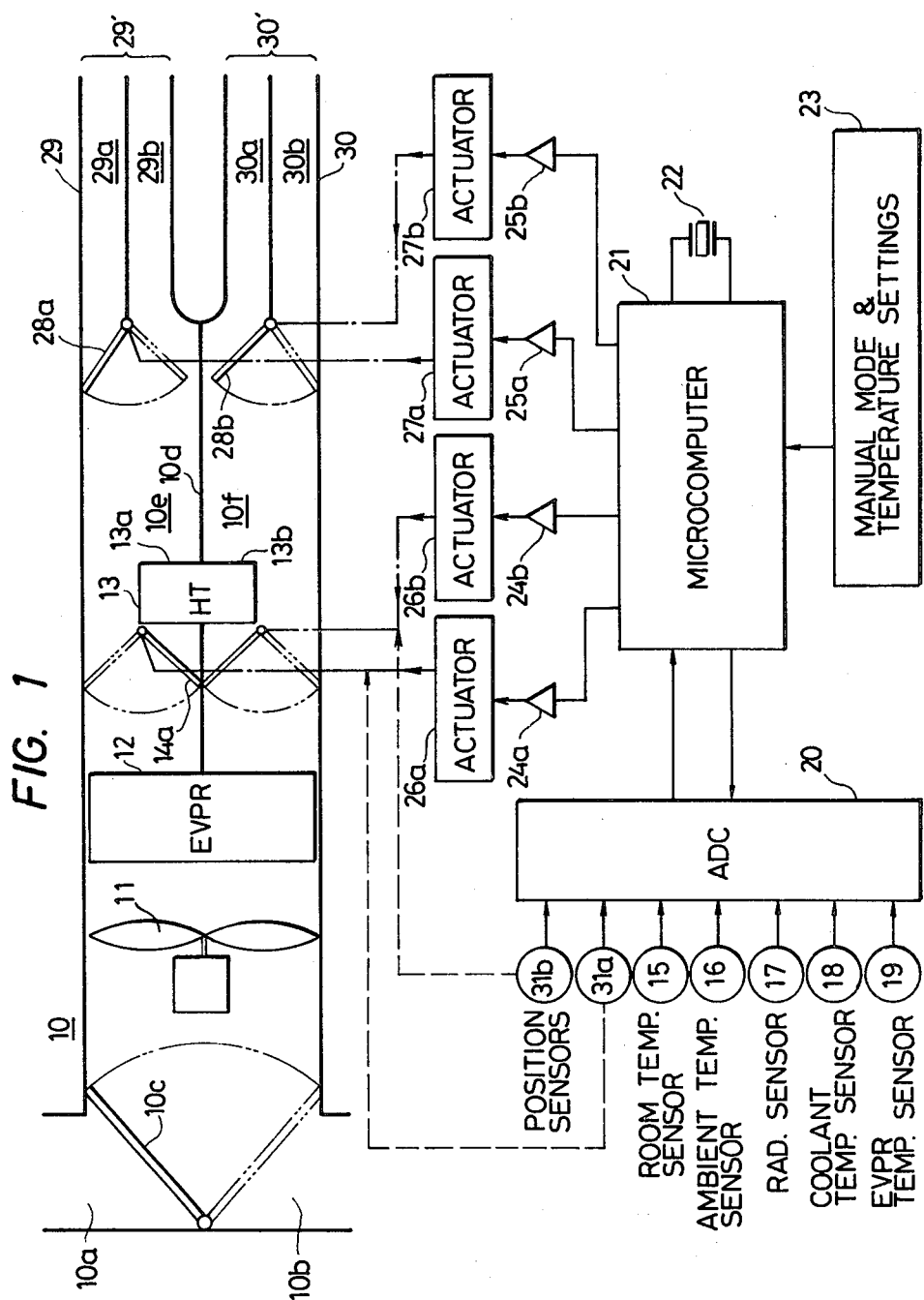
FIG. 1 is an illustration of a block diagram of an air-conditioning system of the present invention for the passenger compartment of a motor vehicle.

A preferred embodiment of the present invention is illustrated schematically in FIG. 1. Indicated at 10 is an air distribution conduit located in the forward part of a roadway vehicle. The conduit 10 has its upstream side bifurcated by a switching damper 10c forming an air inlet 10a for introducing fresh air from the outside of the vehicle and an air inlet 10b for recirculating the conditioned, inside air of the passenger compartment. The damper 10c may be coupled by a linkage to a manually operated lever or the like to allow vehicle occupants to select between the air intake mode and recirculation mode. A blower 11 is located adjacent to the selecting damper 10c to direct an airflow to the downstream end of the conduit 10. An evaporator 12 is located on the downstream side of the blower 11 for cooling the blown air by heat transfer to the refrigerant circulated by a compressor which is coupled to the vehicle engine by a solenoid clutch, not shown. A separating plate 10d extends downstream from the evaporator 12 to divide the distribution conduit 10 into an upper conduit portion 10e and a lower conduit portion 10f. A heating radiator 13, which gives off heat by circulating engine coolant through a radiator core, is located downstream of the evaporator 12 and secured by the separating plate 10d so that the upper and lower halves 13a, 13b of the heating radiator extend halfway to the top and bottom walls of the respective conduit portions 10e, 10f.

Air mixing dampers 14a and 14b are pivotally mounted respectively in the conduit portions 10e and 10f on the upstream sides of the heater portions 13a and 13b to independently proportion the amounts of cool air to be presented to the upper and lower heater portions 13a and 13b and the amounts of such air to be diverted bypassing the heating radiator 13.

Figure 2:
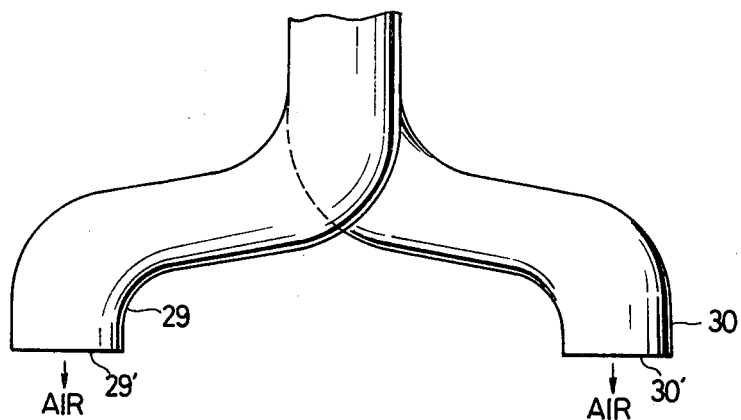
FIG. 2 is a schematic illustration of a partial plan view of the air distribution conduit of FIG. 1.

The downstream end of upper conduit portion 10e is formed into a conduit 29 having an outlet 29' open to the driver's seat ad the downstream end of lower conduit portion 10f is formed into a condduit 30 having an outlet 30' open to the adjacent seat as illustrated in FIG. 2. The conduit 29 is divided by a plate 10g into vertically spaced apart chambers 29a and 29b for directing cool and worm air respectively in ventilation and heating modes. Similarly, the conduit 30 is divided by a plate 10h into vertically spaced apart chambers 30a and 30b for ventilation and heating modes. Air switching dampers 28a and 28b are each pivotally mounted on a horizontal axis at the upstream end of the separating plates 10g and 10h, respectively, to divert a variable amount of cool and warm air selectively to the face and leg portions of the occupants in the front seats.

Various temperature sensors are provided which include an interior or room temperature sensor 15 which may be located between the front seats to generate an analog signal Tr representative of the inside temperature of the passenger compartment. While only one such room temperature sensor is shown in FIG. 1, a plurality of such temperature sensors may be located in of several air-conditioned zones. An exterior or ambient temperature sensor 16 is provided to generate an analog signal Tam representing the outside temperature. A sunlight radiation sensor 17 is located in the passenger compartment to provide an analog signal Ts representating the amount of radiant heat in the compartment. A coolant temperature sensor 18 is located at the inlet port of the heater 13 where the engine coolant is discharged from the vehicle engine for generating an analog signal Tw representing the coolant temperature. An evaporator temperature sensor 19 is located at the downstream side of the evaporator 12 to generate an evaporator temperature signal Te. Angular position sensors 31a and 31b are operatively linked to the air mixing dampers 14a and 14b respectively to detect their angular positions to generate analog signals $Ar_1$, $Ar_2$.

The signals generated by the sensors 15 to 19, 31a and 31b are converted to corresponding binary coded digital signals by an analog-digital converter 20 and applied to a controller or microcomputer 21 which is provided with a memory programmed according to a control algorithm of the invention to control the angular positions of the air mixing dampers 14a, 14b and switching dampers 28a, 28b in response to the digitally converted input signals from the various sensors.

The microcomputer 21 comprises a read only memory in which the programmed instructions are stored according to the control algorithm which will be described and a central processing unit for operating on digital input signals according to the instructions given by the memory, and a random access memory for writing and reading data used temporarily during the operating process of the central processor. Further included is an input/output port for interfacing between the input and output data. All the components of the microcomputer are mounted on a single LSI chip. A quartz oscillator 22 supplies a time base to the microcomputer.

The control signals for the dampers 14a, 14b, 28a and 28b from the microcomputer 21 are respectively amplified by drivers 24a, 24b, 25a and 25b and fed to actuators 26a, 26b, 27a and 27b which are coupled by suitable linkages to the associated dampers as illustrated. Illustrated at 23 is a control board having a manual mode switch for allowing the switching dampers 28a, 28b to be manually operated and temperature setting controls for respectively setting reference temperatures $Tset_1$ and $Tset_2$ with respect to air-conditioned zones. Up-down counters as shown and described in Japanese Laid-open Patent Publication (Tokkaisho) 55-68417 may be advantageously employed for setting the reference temperatures.

Figure 3:
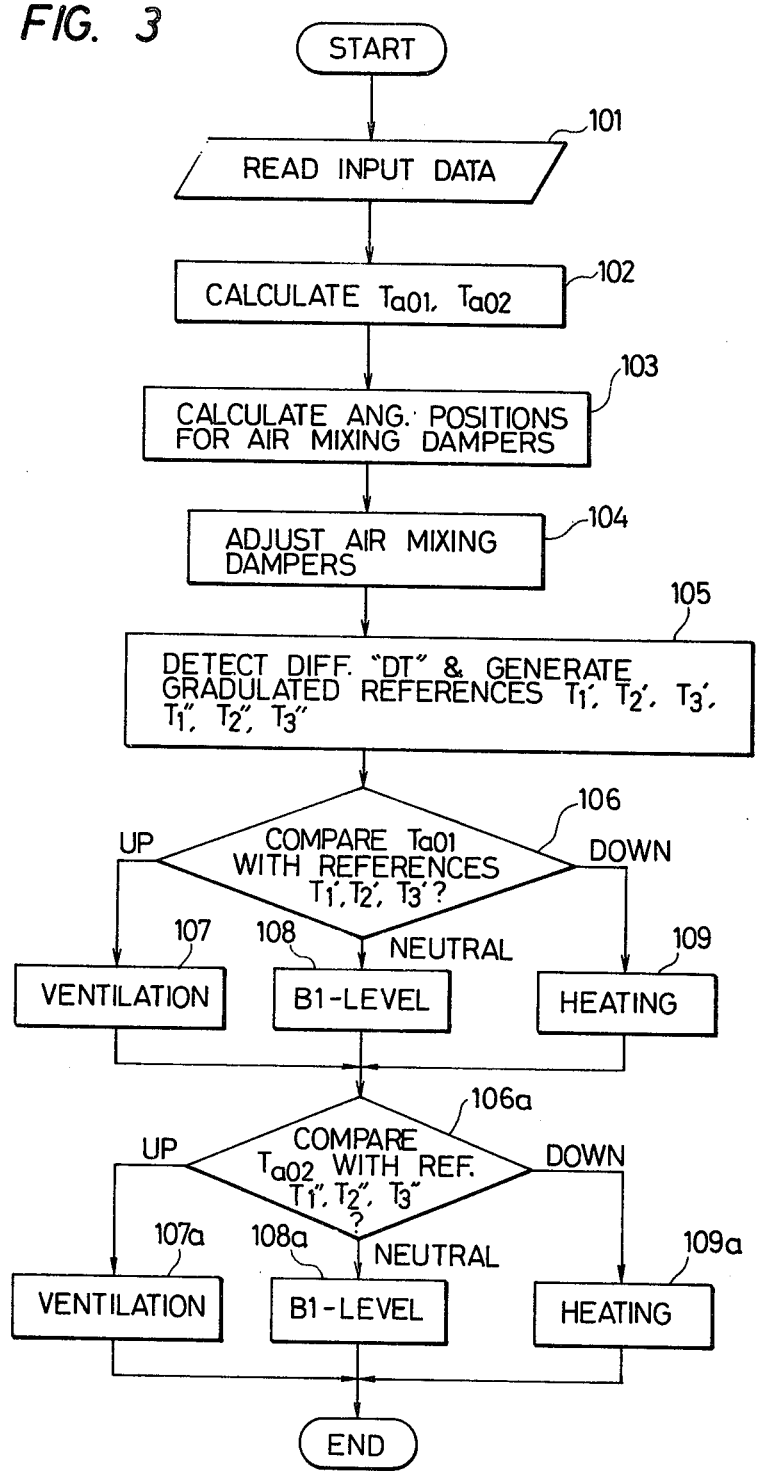
FIG. 3 is a flow diagram describing the programmed instructions of the microcomputer of FIG. 1.

Referring to the flow diagram of FIG. 3 which describes the programmed instructions of the microcomputer 21. Following the operation of a main switch, not shown, the microcomputer 21 is powered by a vehicle-mounted battery and starts operating on input data at regular intervals, typically at several hundreds milliseconds.

The control algorithm includes a block 101 in which input data supplied from various sensors through analog-digital converter 20 and control data from board 23 are written into specified cell locations of the random access memory. The digitally converted temperature data Tr, Tam and Ts from sensors 15, 16, 17 and temperature setting data Tset from board 23 are used to calculate the following formula in a block 102 to provide estimation of the temperature Tao of the air discharged from the duct 10:

$$Tao = Kset \times Tset - Kr \times Tr - Kam \times Tam - Ks \times Ts + C$$

where Kset, Kr, Kam, Ks And C are experimentally determined constants. This calculation is made with respect to the temperature settings $Tset_1$ and $Tset_2$ to derive $Tao_1$ and $Tao_2$ in order to control the temperatures of these air-conditioned zones to the respective settings.

Following the calculation step in block 102 control exits to a block 103 where the CPU operates on the evaporator temperature data Te, coolant temperature data Tw and the estimated temperature data $Tao_1$ and $Tao_2$ to calculate the following formulas to obtain angular positions $SW_1$ and $SW_2$ for the air mixing dampers 14a, 14b, respectively:

$$SW_1 = (Tao_1 - Te)/(Tw - Te - D_1) \times D_2$$

$$SW_2 = (Tao_2 - Te)/(Tw - Te - D_1) \times D_2$$

where, $D_1$ and $D_2$ are constants. It is seen that the calculations in block 103 take into account the actual heat transfer capabilities of the evaporator 12 and heater 14 to optimize the of angular positions of mixing dampers 14a and 14b.

In a block 104 the angular position data $SW_1$ and $SW_2$ are compared respectively with actual angular position data $Ar_1$ and $Ar_2$ from sensors 31a and 31b. The differences between them are used to provide correction signals to the drivers 24a, 24b to move the air mixing dampers 14a and 14b until the difference are reduced to an acceptable level.

A block 105 shows a step in which the microcomputer determines in which one of operating modes (heating, bi-level and ventilation modes) the system is to be operated. This is accomplished by deriving a control variable from the angular position signals $SW_1$ and $SW_2$ since the latter reflects actual heat transfer capacities of the evaporator 12 and heater 13 as mentioned above.

Figure 4:
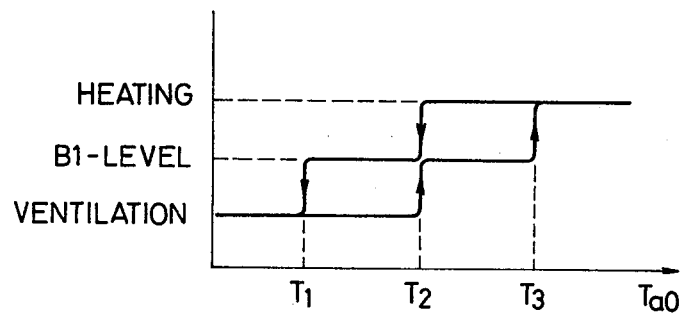
FIG. 4 is a graphic illustration of a mode switching characteristic of the invention.

Specifically each estimated temperature Tao may be checked against graduated references T1, T2 and T3, as shown in FIG. 4, to determine the angular position of each switching damper 28 provided that the upper and lower conduit portions 10e and 10f are satisfactorily thermally isolated from each other. However, due to the presence of inherent thermal interferences between the two conduit portions 10e and 10f, the references $T_1$, $T_2$, $T_3$ are corrected to minimize the effect of such interferences on the temperatures at the outlets of duct 10. More specifically, if there is a difference in temperature setting between air-conditioned zones the air mixing dampers 14a and 14b will be positioned to the different settings. Such difference results in heat transfer from one passage to the other through the common separating plate 10d. The actual temperature at each outlet of duct 10 thus deviates from the estimated value Tao. In order to compensate for the heat transfer between the passages 10e and 10f a trimming value DT is derived as follows:

$$DT = E \times (SW_1 - SW_2)$$

This trimming value is added to or subtracted from the reference temperatures $T_1$, $T_2$ and $T_3$ to derive the following corrected reference temperature values:

$T_1' = T_1 + DT$
$T_2' = T_2 + DT$
$T_3' = T_3 + DT$
$T_1'' = T_1 - DT$
$T_2'' = T_2 - DT$
$T_3'' = T_3 - DT$ where, E is a constant.

Figure 5:
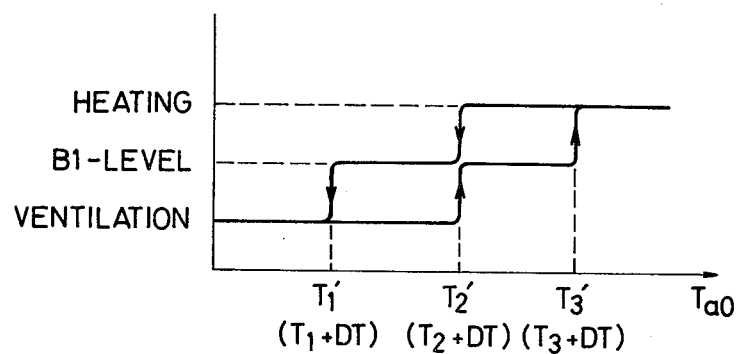
FIG. 5 is a graphic illustration of a preferred mode switching characteristic.

The angular position of the upper switching damper 28a is determined by checking the estimated value Tao1 against the graduated references $T_1'$, $T_2'$ and $T_3'$ to select one of the heating, bi-level and ventilation modes as illustrated in FIG. 5. Likewise, the angular position of the lower switching damper 28b is determined by checking the estimated value Tao2 against the graduated references $T_1''$, $T_2''$ and $T_3''$. In this way, the air conditioning system of the invention effectively prevents warm air from issueing from the ventilator outlets 29a and 30a and cool air from issueing from the heater outlets 29b and 30b, which might otherwise occur due to the transfer of thermal energy between passages 10e and 10f.

The checking operation just described is performed in a block 106 with respect to the estimated temperature data Tao1 by comparing it with each of the references $T_1'$, $T_2'$ and $T_3'$ to cause control to exit to one of blocks 107, 108 and 109. Assuming that the previous record shows that Tao1 is on the increase, block 107 is selected to move the switching damper 28a to a downward position to effect ventilation mode if Tao1 is between $T_1'$ and $T_2'$ and block 108 is selected to move the damper 28a to a neutral, or horizontal position to effect bi-level mode if Tao1 is between $T_2'$ and $T_3'$. Block 109 is selected if Tao1 is increasing above the reference $T_3'$ to move the damper 28a to an upward position to effect heating mode. When the previous record shows that Tao1 is on the decrease from a level higher than $T_3'$, the heating mode will be continued until Tao1 reaches $T_2'$, whereupon the bi-level mode will be effected until it $T_1'$ is reached. With Tao1 further decreasing to a level lower than $T_1'$, the mode is switched to ventilation.

Similar processes are performed with respect to the estimated value Tao2 in blocks 106a, 107a, 108a and 109a for operating the switching damper 28b.

With the microcomputer performing the above steps at high repetition rate, the air mixing dampers 14a and 14b are feedback controlled so that the temperature of each air-conditioned zone approaches the reference setting.

It is to be understood that the present invention could also be applied to a system having more than two conduit portions. In this instance, the feedback control may be carried out on the basis of an average value of estimated temperatures Tao associated with airflow passages of each pair.

Various modifications are apparent to those skilled in the art without departing from the scope of the invention which is only limited by the appended claims.

What is claimed is:

1. An air-conditioning system for a motor vehicle, comprising:

an air distribution conduit including a common passageway having an inlet at one end thereof and a pair of first and second passageways leading from said common passageway, upstream portions of said first and second passageways sharing a common partition and downstream portions of said first and second passageways being horizontally spread apart from each other and respectively having first and second outlets at horizontally spaced apart locations of a passenger compartment of said vehicle, the downstream portion of the first passageway having a first pair of parallel passages leading to said first outlet and the downstream portion of the second passageway having a second pair of parallel passages leading to said second outlet;

fan means for directing air through said inlet toward said first and second outlets;

evaporator means (12) located in said common passageway downstream of said fan means;

first and second mixing dampers (14a, 14b) located respectively in said first and second passageways downstream of said evaporator;

heater means (13) having first and second half portions (13a, 13b) located in said first and second passageways respectively downstream of said first and second mixing dampers;

a first distribution damper (28a) located upstream of said first pair of vertically spaced passages and a second distribution damper (28b) located upstream of said second pair of vertically spaced passages, there being a plurality of adjustable settings ($T_1$, $T_2$, $T_3$) for each of said distribution dampers;

temperature sensors (15,16) for measuring the temperatures (Tr, Tam) inside and outside the passenger compartment;

temperature setting means (23) for setting first and second reference temperatures (Tset1, Tset2) desired for said first and second horizontally spaced apart locations of the passenger compartment;

data processing means (21) for deriving first and second estimated values (Tao1, Tao2) of temperatures at said first and second outlets from said first and second reference temperatures (Tset1, Tset2) and the measured inside and outside temperatures (Tr, Tam), deriving first and second temperature control signals ($SW_1$, $SW_2$) from the estimated values (Tao1, Tao2) trimming said adjustable settings ($T_1$, $T_2$, $T_3$) of each of said distribution dampers in response to said first and second temperature control signals ($SW_1$, $SW_2$), and comparing said first and second estimated values (Tao1, Tao2) with each of said trimming settings ($T_1'$, $T_2'$, $T_3'$, $T_1''$, $T_2''$, $T_3''$) to generate first and second distribution control signals; and a plurality of motor means (26a, 26b, 27a, 27b) for controlling said first and second mixing dampers in response to said first and second temperature control signals ($SW_1$, $SW_2$) respectively and controlling said first and second distribution dampers in response to said first and second distribution control signals respectively.

2. An air-conditioning system as claimed in claim 1, further comprising additional temperature sensors (18, 19) for measuring the temperatures (Te, Tw) of said evaporator of said engine and wherein said data processing means derives said first and second temperature control signals ($SW_1$, $SW_2$) from said first and second estimated values (Tao1, Tao2) and from the measured temperature (Te, Tw).

3. An air-conditioning system as claimed in claim 2, wherein said first and second temperature control signals are inversely proportional to the difference between the measured temperatures (Te, Tw).

4. An air-conditioning system as claimed in claim 1 or 2, wherein said adjustable settings ($T_1$, $T_2$, $T_3$) are trimmed by a value proportional to the difference between said first and second temperature control signals ($SW_1$, $SW_2$).

5. An air-conditioning system as claimed in claim 3, wherein said adjustable settings ($T_1$, $T_2$, $T_3$) are trimmed by a value proportional to the difference between said first and second temperature control signals ($SW_1$, $SW_2$).

* * * * *